(12) United States Patent
Bekki et al.

(10) Patent No.: US 6,883,550 B2
(45) Date of Patent: Apr. 26, 2005

(54) FLEXIBLE PIPE JOINT

(75) Inventors: Hiroyuki Bekki, Osaka (JP); Tsutomu Kiyozumi, Osaka (JP)

(73) Assignee: Waterworks Technology Development, Osaka (JP)

( * ) Notice: Subject to any disclaimer, the term of this patent is extended or adjusted under 35 U.S.C. 154(b) by 0 days.

(21) Appl. No.: 10/648,882

(22) Filed: Aug. 27, 2003

(65) Prior Publication Data

US 2004/0040606 A1 Mar. 4, 2004

(30) Foreign Application Priority Data

Aug. 29, 2002 (JP) .................................... 2002-251760

(51) Int. Cl.[7] .............................................. F16L 11/00
(52) U.S. Cl. .................... 138/120; 138/155; 285/145.3; 285/302; 285/145.4
(58) Field of Search ................................ 138/120, 155, 138/113, 114; 285/31, 123.12, 145.4, 402, 302, 145.3

(56) References Cited

U.S. PATENT DOCUMENTS

| | | | |
|---|---|---|---|
| 167,505 A | | 9/1875 | Crawford |
| 203,094 A | * | 4/1878 | Wakeman ..................... 285/55 |
| 3,475,039 A | | 10/1969 | Ortloff |
| 3,837,685 A | | 9/1974 | Miller |
| 4,026,119 A | | 5/1977 | Dotti |
| 4,116,478 A | * | 9/1978 | Yamaji et al. ............... 285/302 |
| 4,119,334 A | * | 10/1978 | Steed .......................... 285/236 |
| 4,548,427 A | * | 10/1985 | Press et al. .................... 285/55 |
| 4,641,861 A | * | 2/1987 | Scoboria ....................... 285/39 |
| 4,850,616 A | * | 7/1989 | Pava ............................. 285/41 |
| 5,129,681 A | * | 7/1992 | Yano et al. .................... 285/23 |
| 5,192,094 A | * | 3/1993 | Hamamoto ............... 285/145.5 |
| 5,286,071 A | | 2/1994 | Storage |
| 5,740,839 A | * | 4/1998 | Kuo et al. ................... 138/120 |
| 5,865,378 A | * | 2/1999 | Hollinshead et al. ..... 239/587.1 |
| 6,134,893 A | * | 10/2000 | Bonn .......................... 62/50.7 |
| 6,250,690 B1 | * | 6/2001 | Sakai ....................... 285/145.3 |
| 6,305,426 B1 | * | 10/2001 | Sato et al. ................... 138/120 |
| 6,648,376 B1 | * | 11/2003 | Christianson ............ 285/146.1 |

FOREIGN PATENT DOCUMENTS

| | | |
|---|---|---|
| JP | 10-054487 | 2/1998 |
| JP | 2001041372 | 2/2001 |

* cited by examiner

*Primary Examiner*—James Hook
(74) *Attorney, Agent, or Firm*—Webb Ziesenheim Logsdon Orkin & Hanson, P.C.

(57) ABSTRACT

A flexible pipe joint joins, in a bendable manner, a first pipe member provided with a partially spherical outer circumferential surface that protrudes outward in radial direction and a second pipe member provided with a partially spherical inner surface that can slide along the partially spherical outer circumferential surface. A sleeve made of a synthetic resin is inserted and fitted in a state of contact, bridging the inner circumferential surfaces of the two pipe members. The sleeve has a length that covers a cavity portion that opens inward in radial direction at a location where the two pipe members are joined together, and is elastically deformed substantially maintaining its circular tube shape when following a flexure of the two pipe members. The flexible pipe joint effectively suppresses impediments to the flow volume such as the deposition of sludge and grime while ensuring the intended bendability due to relative sliding of a partially spherical outer circumferential surface of a first pipe member and a partially spherical inner circumferential surface of a second pipe member.

9 Claims, 9 Drawing Sheets

FLEXIBLE PIPE JOINT

BACKGROUND OF THE INVENTION

1. Field of the Invention

The present invention relates to flexible pipe joints with which piping systems of fluid pipes, such as water pipes buried in the ground, can optimally absorb such external forces as shearing forces or bending moments in a direction perpendicular to the pipe axis that occur during earthquakes or differential settlement or the like, so that damage to the fragile portions of the piping system can be avoided. More specifically, the present invention relates to flexible pipe joints, in which a first pipe member provided with a partially spherical circumferential surface that protrude outward in radial direction can be bendably joined with a second pipe member provided with a partially spherical inner circumferential surface that can slide along the partially spherical outer circumferential surface of the first pipe member.

2. Description of the Related Art

There are two types of this kind of flexible pipe joint:

(A) In the flexible pipe joint of the type shown in FIG. 13, a spherical ring member 2 having a partially spherical outer circumferential surface 2a is passed through a pair of cut-out portions (see FIG. 3) that are formed at one end of a second pipe member 3 serving as a socket pipe and that oppose one another in radial direction. The spherical ring member 2 is inserted inside a partially spherical inner circumferential surface 3a formed at one end of the second pipe member 3 in a posture in which the radial direction of the spherical ring member 2 is substantially parallel to the pipe axis X of the second pipe member 3, and the spherical ring member 2 is swiveled inside the partially spherical circumferential surface 3a, changing its posture such that it becomes coaxial with the pipe axis X of the second pipe member 3 (see FIG. 4). Then, a first pipe member serving as an inserted pipe portion is inserted, slidably in the direction of the pipe axis X, into the spherical ring member 2, and a locking member 6 is fitted to a ring-shaped installation groove 5 formed at the front end of the outer circumferential surface of the first pipe member 1. The locking member 6 is substantially C-shaped with an expandable diameter, and limits the range over which the spherical ring member 2 and the first pipe member 1 can move relative to one another in the direction of the pipe axis X by abutting against end surfaces 4a and 4b, of a limiting groove 4 formed at an inner circumferential surface of the spherical ring member 2, that are arranged in opposition in the direction of the pipe axis X.

(B) In the flexible pipe joint of the type shown in FIG. 14, a spherical pipe portion 1A having a partially spherical outer circumferential surface 1d is formed integrally at one end of a first pipe member 1 serving as an inserted pipe portion. A partially spherical inner circumferential surface 3a formed at one end of a second pipe member 3, which serves as the socket pipe portion, is slidably fitted to the partially spherical outer circumferential surface 1d of the spherical pipe portion 1A of the first pipe member 1. On the other hand, a catch member 32 provided with a partially spherical sliding surface that slides against the partially spherical outer circumferential surface 1d of the spherical pipe portion 1A of the first pipe member 1 is fixed to a flange portion 3K of the second pipe member 3 with bolts 33 and nuts 34.

In type (A), a portion of the limiting groove 4 formed on the inner circumferential surface of the spherical ring member 2 is open toward the flow path inside the pipe from the front end of the first pipe member 1, forming a ring-shaped cavity portion S1. Moreover, a ring-shaped cavity portion S2 formed by one end surface of the spherical ring member 2 and the tapered inner circumferential surface 3b connected to the partially spherical inner circumferential surface 3a of the second pipe member 3 is open toward the flow path inside the pipe. In type (B) on the other hand, the inner circumferential surface of the partially spherical pipe portion 1A of the first pipe member 1 is open toward the flow path inside the pipe, forming a ring-shaped cavity portion S3. Moreover, a ring-shaped cavity portion S4 formed by the partially spherical inner circumferential surface 3a of the second pipe member 3 and the front end of the partially spherical pipe portion 1A is open toward the flow path inside the pipe.

Therefore, even though it may not affect the intended bendability of the first pipe member and the second pipe member, if used for wastewater piping of sewers, it is not possible to completely avoid the deposition of sludge and grime in the cavity portions that open inward in radial direction at the location where the pipe members 1 and 3 are joined together. Moreover, if used for clean water piping of tap water, the flow resistance tends to increase at the cavity portions that open inward in radial direction at the location where the pipe members 1 and 3 are joined together.

As a method for preventing deposition of sludge and grime and impediments to the flow volume in type (A), there is the method of fitting a ring-shaped padding member 30 made of rubber into the limiting groove 4 of the spherical ring member 2, as shown in FIG. 13. And for type (B), there is the method of fastening a ring-shaped padding member 31 made of rubber to the inner circumferential surface of the partially spherical pipe portion 1A of the first pipe member 1, as shown in FIG. 14. But in either case, it is not possible to completely fill the cavity portion formed in the range over which the partially spherical outer circumferential surfaces 2a and 1d on the side of the first pipe member 1 slide against the partially spherical inner circumferential surface 3a of the second pipe member 3. Therefore, these measures do not sufficiently attain the effect of preventing the deposition of sludge and grime or the effect of lowering flow impediments.

In view of the above problems, it is a main object of the present invention to present a flexible pipe joint that effectively suppresses the deposition of sludge and grime as well as impediments to the flow volume while ensuring the intended bendability due to relative sliding of a partially spherical outer circumferential surface of a first pipe member and a partially spherical inner circumferential surface of a second pipe member.

SUMMARY OF THE INVENTION

In the characteristic configuration according to a first aspect of the present invention, a flexible pipe joint joins, in a bendable manner, a first pipe member provided with a partially spherical outer circumferential surface that protrudes outward in radial direction and a second pipe member provided with a partially spherical inner surface that can slide along the partially spherical outer circumferential surface, wherein a sleeve made of a synthetic resin is inserted and fitted in a state of contact, bridging the inner circumferential surfaces of the two pipe members, the sleeve having a length that covers a cavity portion that opens inward in radial direction at a location where the two pipe members are joined together, and is elastically deformed while substantially maintaining its circular tube shape when following a flexure of the two pipe members.

With this characteristic configuration, the cavity portion that opens inward in radial direction at a location where the two pipe members are joined together is covered by the sleeve made of a synthetic resin that is inserted in a state of contact, bridging the inner circumferential surfaces of the two pipe members, so that deposition of sludge and grime as well as impediments to the flow volume can be suppressed.

Moreover, the sleeve is elastically deformed while substantially maintaining its circular tube shape when following a flexure of the two pipe members due to relative sliding between the partially spherical outer circumferential surface of the first pipe member and the partially spherical inner circumferential surface of the second pipe member. Therefore, the inner circumferential surface of the bent portion of the sleeve can be maintained in a substantially smooth state with few dents, and the flow resistance can be reduced.

Consequently, the deposition of sludge and grime as well as impediments to the flow volume can be suppressed more effectively than in conventional structures, while ensuring the intended bendability due to relative sliding of the partially spherical outer circumferential surface of the first pipe member and the partially spherical inner circumferential surface of the second pipe member.

In the characteristic configuration according to a second aspect of the present invention, the sleeve has a length that goes beyond an intersection between a virtually extended surface of the partially spherical outer circumferential surface and the inner circumferential surface of the first pipe member.

With this characteristic configuration, the cavity portion that opens inward in radial direction at a location where the two pipe members are joined together can be covered reliably, regardless of bending and sliding of the second pipe member along the partially spherical outer circumferential surface of the spherical ring member installed in the first pipe member.

In the characteristic configuration according to a third aspect of the present invention, a spherical ring member having a partially spherical outer circumferential surface is installed in the first pipe member such that it can slide within a predetermined range in pipe axis direction, and the sleeve has a length that can cover any cavity portion along an entire telescopic range of the two pipe members.

With this characteristic configuration, the cavity portion that opens inward in radial direction at a location where the two pipe members are joined together can be covered even more reliably, regardless of not only bending and sliding of the second pipe member along the partially spherical outer circumferential surface of the spherical ring member attached to the first pipe member but also of telescopic sliding of the two pipe members in pipe axis direction.

Consequently, the deposition of sludge and grime as well as impediments to the flow volume due to turbulences can be suppressed even better.

In the characteristic configuration according to a fourth aspect of the present invention, a fixing means for preventing relative motion in pipe axis direction between one of the pipe members and the sleeve is provided.

With this characteristic configuration, the position to which the sleeve is inserted and mounted does not shift when the two pipe members are bent or expanded or retracted, and the deposition of sludge and grime as well as impediments to the flow volume can be suppressed effectively for long periods of time, while ensuring the intended bendability of the two pipe members.

In the characteristic configuration according to a fifth aspect of the present invention, a reinforcement core that suppresses deformation of the sleeve at least at a location that contacts a portion of the inner circumferential surface of the pipe members is inserted and fitted into the sleeve.

With this characteristic configuration, even when the contact length in the pipe axis direction at the location where the outer circumferential surface of the sleeve is in contact with the inner circumferential surface of the pipe members is short, when a counterforce acts on the contact location as a result of a flexure of the pipe members, then protruding deformation in inward radial direction at the contact location of the sleeve due to this counterforce can be suppressed.

Consequently, the sleeve is elastically deformed while substantially maintaining its circular tube shape when following a flexure of the two pipe members, so that the cross-sectional area of the flow path is not diminished considerably, and the flow resistance can be reduced.

In the characteristic configuration according to a sixth aspect of the present invention, the sleeve is made of polyethylene and has the shape of a circular tube, and the sleeve's thickness is in a range of 1.5 mm to 4.0 mm, preferably 2.0 mm to 3.0 mm.

With this characteristic configuration, if the sleeve is made of polyethylene and the sleeve's thickness is at least 1.5 mm, then the flexural deformation in the radial direction of the sleeve when the two pipe members are bent can be reduced, whereas if the sleeve's thickness is at most 4.0 mm, then the sleeve does not obstruct the bending of the pipe members.

Moreover, if the sleeve is made of polyethylene and the sleeve's thickness is at least 2.0 mm, then the flexural deformation in the radial direction of the sleeve when the two pipe members are bent can be suppressed effectively, whereas if the sleeve's thickness is at most 3.0 mm, then the two pipe members can be bent smoothly.

In the characteristic configuration according to a seventh aspect of the present invention, a front end on the insertion side of the inner circumferential surface of the sleeve is provided with a tapered surface whose diameter becomes larger toward the front end.

With this characteristic configuration, the step difference between the front end on the insertion side of the sleeve and the inner circumferential surface of the pipe members can be made smooth, reducing resistance, so that the deposition of sludge and grime as well as impediments to the flow volume can be suppressed effectively.

In the characteristic configuration according to an eighth aspect of the present invention, the sleeve is provided with a fixing means preventing relative motion in pipe axis direction with respect to one of the pipe members, and a provisional stopping protrusion that, by engaging a depression formed in the inner circumferential surface of the other pipe member, prevents relative movement in pipe axis direction between the two pipe members, and the provisional stopping protrusion is configured such that its provisional stopping can be released by shearing due to an external force in pipe axis direction.

With this characteristic configuration, one end of the sleeve is fixed to one of the pipe members by the fixing means, and the other end of the sleeve engages with the provisional stopping protrusion a depression formed in the inner circumferential surface of the other pipe member, so that even when a non-balanced force is acting due to the normal pressure of the pipe water, the two pipe members do not extend or contract, but preserve a predetermined telescoping margin, however, when a large external force acts due to an earthquake or the like, then the provisional stopping protrusion is sheared and the telescopic sliding ability of the two pipe members is ensured.

Moreover, since a sleeve made of a synthetic resin is inserted and mounted inside the two pipe members in order to effectively suppress the deposition of sludge and grime as well as impediments to the flow volume, there is no corrosion, as there would be if a provisional stopping structure made of metal for provisionally stopping the relative motion of the two pipe members in the pipe axis direction would be provided on the outer circumferential surface side of the two pipe members. This prevents telescopic action of the two pipe members for a long period of time, except when large forces are applied as during earthquakes, and is also advantageous with regard to manufacturing costs.

DESCRIPTION OF THE PREFERRED EMBODIMENTS

Figure 1:
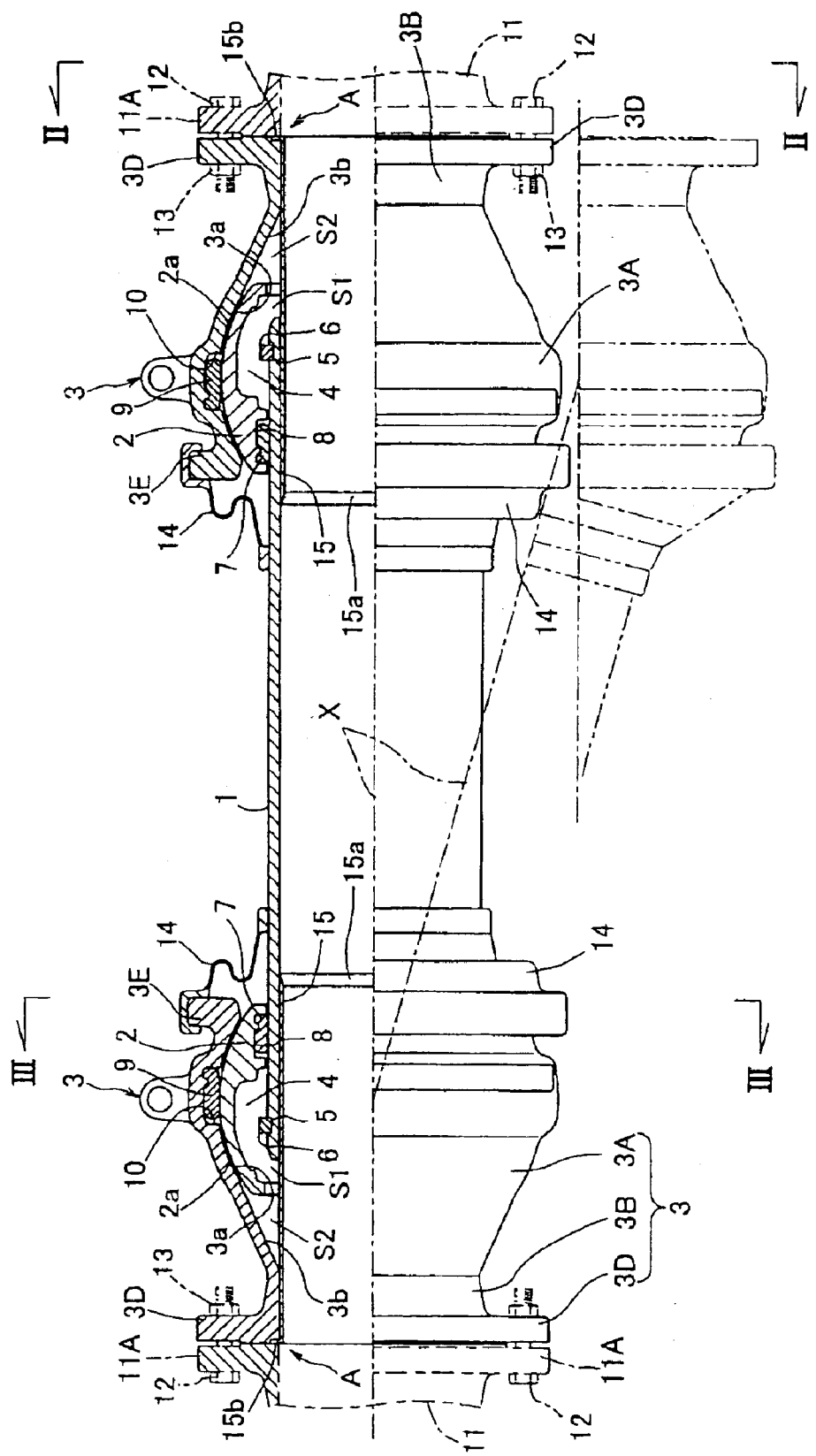
FIG. 1 is a half outside and half sectional lateral view of a telescopic flexible joint according to a first embodiment of the present invention.
Figure 2:
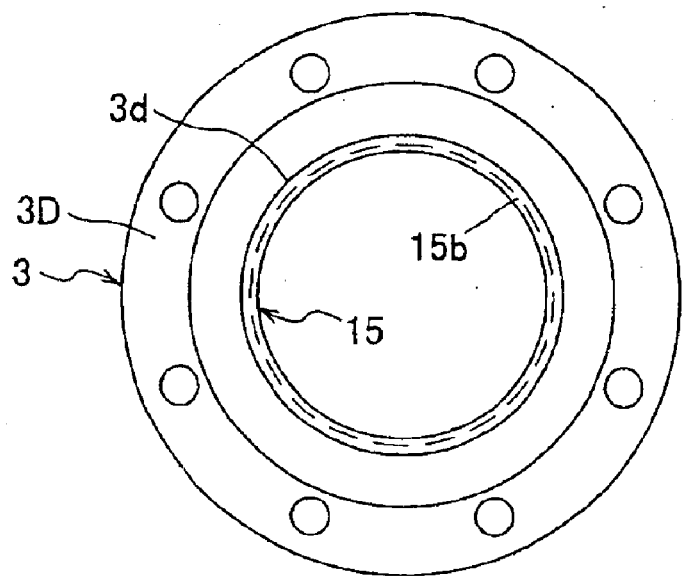
FIG. 2 is a magnified cross-sectional view taken along the line II—II in FIG. 1 and viewed in arrow direction.

The following is a description of embodiments of the present invention, with reference to the accompanying drawings.

First Embodiment

FIGS. 1 to 7 show a telescopic flexible pipe joint provided in a piping system of water pipes, which are one example of fluid pipes. Spherical ring members 2 made of cast iron whose overall outer circumferential surface 2$a$ is formed into a partially spherical shape are fitted onto the two ends of a first pipe member 1 made of cast iron formed in straight pipe shape and serving as an inserted pipe, such that the spherical ring members 2 and the first pipe member 1 can slide relative to one another in the direction of the pipe axis X. Partially spherical inner circumferential surfaces 3$a$ formed at the ends of second pipe members 3 that are made of cast iron and serve as socket pipes are fitted onto the spherical ring members 2, such that the inner circumferential surfaces 3$a$ and the spherical ring members 2 can slide (be bent) relative to one another along the partially spherical outer surfaces 2$a$ of the spherical ring members 2.

Ring-shaped installation grooves 5 are formed at both ends in the direction of the pipe axis X of the outer circumferential surface of the first pipe member 1. The length of the installation grooves 5 in the direction of the pipe axis X is small compared to that of a ring-shaped limiting groove 4 that is formed on one side in the direction of the pipe axis X in the inner circumferential surface of each spherical ring member 2. Moreover, a substantially C-shaped locking member 6 made of stainless steel is removably fitted into each of the installation grooves 5. The locking members 6, which can be spread to expand their diameter, limit the range in which the spherical ring member 2 and the first pipe member 1 can move relative to one another in the direction of the pipe axis X by abutting against two end surfaces 4$a$ and 4$b$ of the corresponding limiting grooves 4. Furthermore, the spacing in radial direction between the outer circumferential surface of the first pipe member 1 and the inner circumferential surface 4$c$ of the limiting groove 4 is set to a spacing that makes it possible to attach or remove the locking members 6 in the direction of the pipe axis X when their diameter has been widened.

A ring-shaped seal holding groove 8 is formed near one end in direction of the pipe axis X of each of the spherical ring members 2. The seal holding grooves 8 each hold an elastic seal member 7 made of synthetic rubber for hermetic sealing between the spherical ring members 2 and the outer circumferential surface of the first pipe member 1. Moreover, a seal holding groove 10 is formed in the partially spherical inner circumferential surface 3a of the spherical pipe portions 3A of each of the second pipe members 3. The seal holding grooves 10 each hold an elastic seal member 9 made of synthetic rubber for hermetic sealing between the second pipe members 3 and the partially spherical outer circumferential surfaces 2a of the spherical ring member 2.

Figure 3:
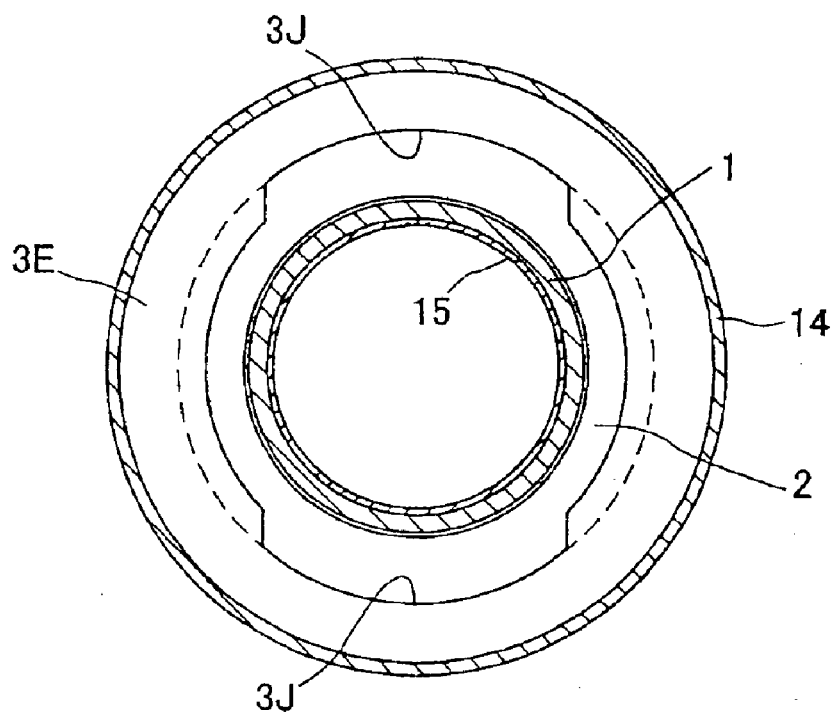
FIG. 3 is a magnified cross-sectional view taken along the line III—III in FIG. 1 and viewed in arrow direction.
Figure 4:
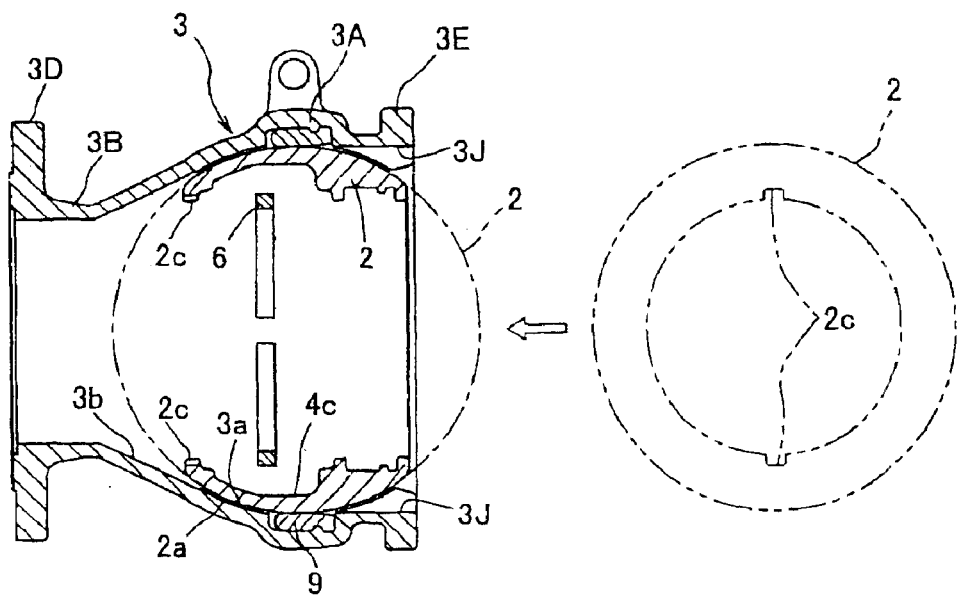
FIG. 4 is a diagram illustrating how the spherical ring member is installed in the spherical pipe portion of the second pipe member.
Figure 5:
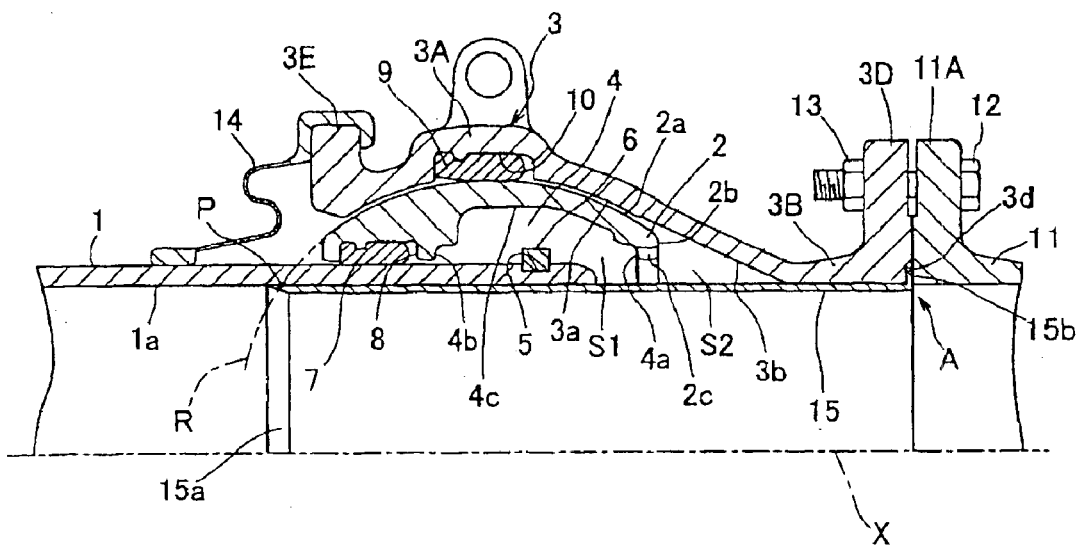
FIG. 5 is a magnified lateral cross section of the essential portions.

As shown in FIG. 3, at two radially opposite locations at the socket-side end of the spherical pipe portion 3A of the second pipe members 3, cutout portions 3J whose width is slightly larger than the length in the direction of the pipe axis X of the spherical ring member 2 are formed facing the inner space formed at the partially spherical inner circumferential surface 3a of this spherical pipe portion 3A. The cutout portions 3J go all the way through in the direction of the pipe axis X. As shown in FIG. 4, at two radially opposite locations at the end of the spherical ring member 2, cutout portions 2c whose width is slightly larger than the length in the direction of the pipe axis X of the locking member 6 are formed facing the limiting groove 4 of the spherical ring members 2. The cutout portions 2c go all the way through in the direction of the pipe axis X.

To install the locking member 6 in the spherical ring member 2, the locking member 6 is passed through the cutout portion 2c with its radial direction aligned with the pipe axis X and inserted into the limiting groove 4 of the spherical ring member 2, after which it is swiveled in the limiting groove 4.

To install the spherical ring member 2 in the spherical pipe portion 3A of the second pipe member, the spherical ring member 2 is similarly passed through the cutout portion 3J with its radial direction aligned with the pipe axis X, and inserted into the spherical pipe portion 3A, as shown in FIG. 4. After that, the spherical ring member 2 is swiveled within this internal space along the partially spherical circumferential surface 3a, and mounted in a coaxial posture in which the axis of the spherical ring member 2 coincides with the pipe axis X of the second pipe member 3

After that, the locking member 6, which has been arranged coaxially to the pipe axis X of the second pipe member 3 is radially spread against the elastic restoration force, and fitted into the installation groove 5 of the first pipe member 1 which has been inserted into the spherical ring member 2.

The respective ends of a straight pipe portion 3B of each of the second pipe members 3 are provided with an integrally formed coupling flange 3D that can be rigidly coupled to a coupling flange 11A of a piping element 11 such as a water pipe or a gate valve with fasteners, such as bolts 12 and nuts 13. The respective ends of a spherical pipe portion 3A of each of the second pipe member 3 are provided with an integrally formed attachment flange 3E that removably interlock with and hold one end of a flexuous and watertight cover 14 made of synthetic rubber.

An opening of a cavity portion that opens inward in radial direction at the location where the two pipe members 1 and 3 are joined together, that is, an annular cavity portion S1 is formed by opening a portion of the limiting groove 4 formed in the inner circumferential surface of the spherical ring member 2 toward the flow path in the pipe from the front side of the first pipe member 1. Moreover, an opening of a ring-shaped cavity portion S2 is formed by an end face 2b of the spherical ring member 2 and the tapered inner circumferential surface 3b that is linked to the partially spherical inner circumferential surface 3a of the second pipe member 3. A sleeve 15 made of a synthetic resin is inserted tightly, bridging the inner circumferential surfaces of the two pipe members 1 and 3 from the opening on the side of the coupling flange 3D of the second pipe member 3. This sleeve 15 has a length covering the above-mentioned two openings and is elastically deformed while substantially maintaining its circular tube shape when following a flexure of the two pipe members 1 and 3. Moreover, a fixing means A is provided that prevents relative movement of the sleeve 15 and the second pipe member 3 in the direction of the pipe axis X.

The sleeve 15 has a length that goes beyond the intersection P between a virtually extended surface of the partially spherical outer circumferential surface 2a and the inner circumferential surface 1a of the first pipe member 1, and is set to a length that can cover the cavity portions S1 and S2 over the entire telescopic range of the pipe members 1 and 3.

Furthermore, the sleeve 15 is circular tube shaped and made of a polyethylene resin, such as high-density polyethylene (HDPE) or high-performance polyethylene (HPPE). Its thickness is set to a range of 1.5 mm to 4.0 mm, and more preferably to a range of 2.0 mm to 3.0 mm. Moreover, the insertion front end portion of the inner circumferential surface of the sleeve 15 is provided with a tapered surface 15a whose diameter increases toward the front end side.

At the fixing means A, a circular ring-shaped brim portion 15b protruding outward in radial direction is formed integrally at the base end of the sleeve 15. The coupling flange 3D of the second pipe member 3 is provided with a depression 3d into which the brim portion 15b of the sleeve 15 can be fitted in the direction of the pipe axis X. That is to say, rigidly coupling the coupling flange 3D of the second pipe member 3 and the coupling flange 11A of the piping element 11 prevents relative movement of the sleeve 15 and the second pipe member 3 in the direction of the pipe axis X.

Figure 6:
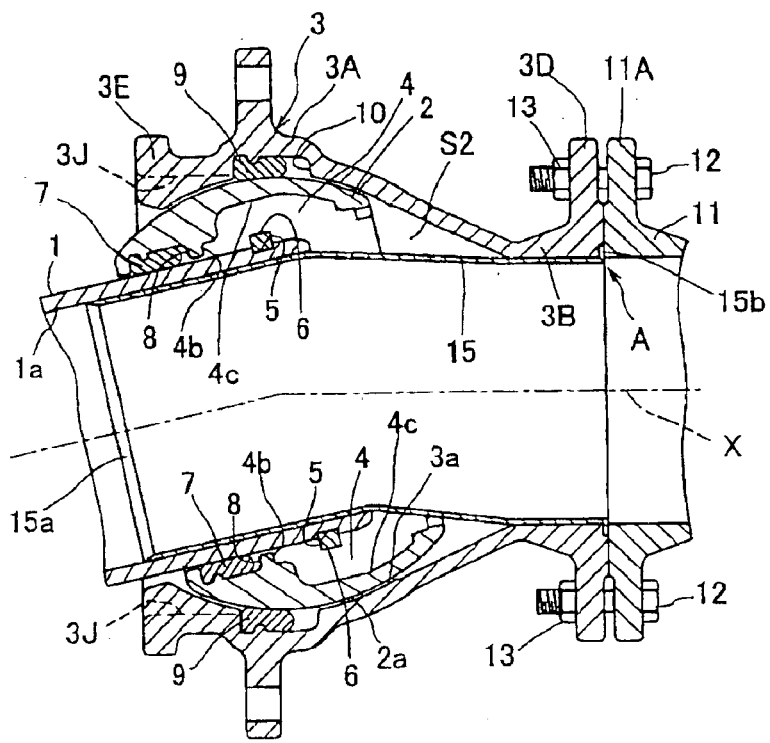
FIG. 6 is a magnified lateral cross section of the essential portions illustrating bending.
Figure 7:
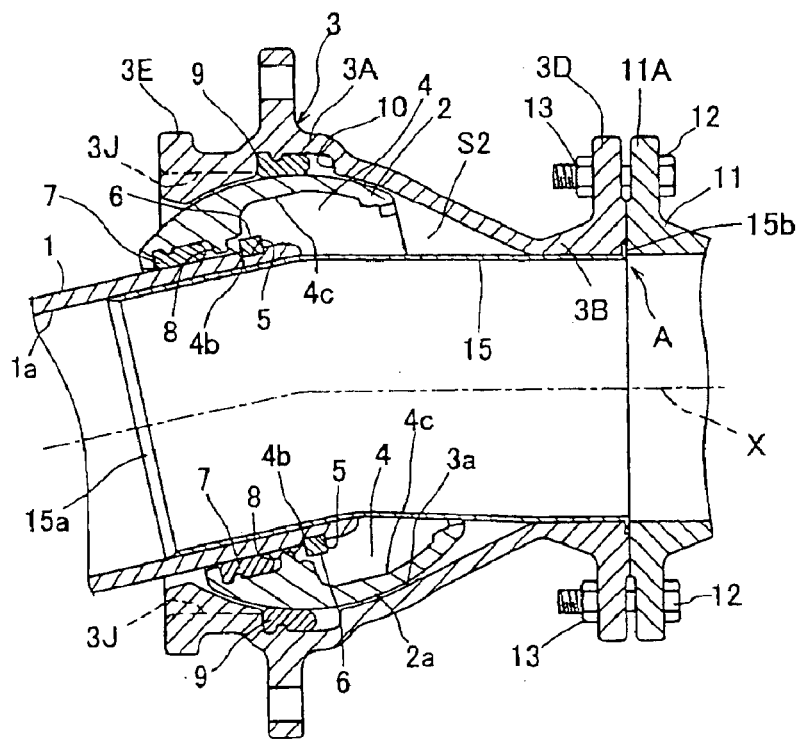
FIG. 7 is a magnified lateral cross section of the essential portions illustrating bending and telescoping.

With the polyethylene sleeve 15 inserted and tightly fitted, bridging the inner circumferential surface of the two pipe members 1 and 3, the cavity portions S1 and S2 are open in the inward radial direction at the locations where the pipe members 1 and 3 are joined together can be reliably covered regardless note only of flexural sliding of the second pipe member 3 along the partially spherical outer circumferential surface 2a of the spherical ring member 2 attached to the first pipe member 1, but also of telescopic sliding of the pipe members 1 and 3 in the direction of the pipe axis X, as shown in FIGS. 6 and 7, so that the deposition of sludge and grime as well as impediments to the flow volume such as turbulences can be prevented.

And moreover, the sleeve 15 follows the flexure due to the relative sliding of the partially spherical outer surface 2a of the spherical ring member 2 and the partially spherical inner circumferential surface 3a of the second pipe member 3, and substantially maintains its circular tube shape when being elastically deformed, so that the cross-sectional area of the flow path is not diminished considerably, and the flow resistance can be reduced.

Second Embodiment

Figure 8:
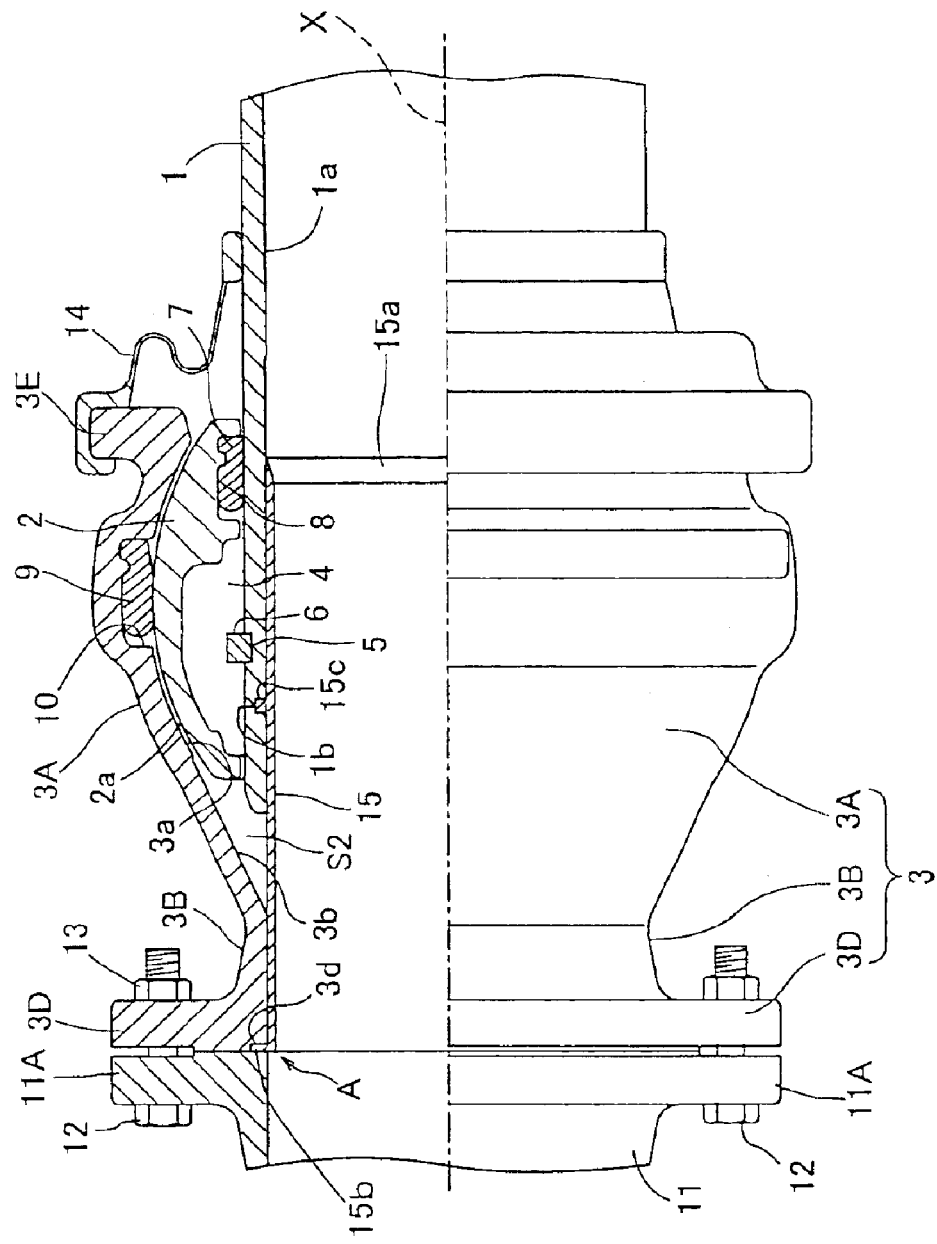
FIG. 8 is a half outside and half sectional magnified lateral view of a telescopic flexible joint according to a second embodiment of the present invention.
Figure 9:
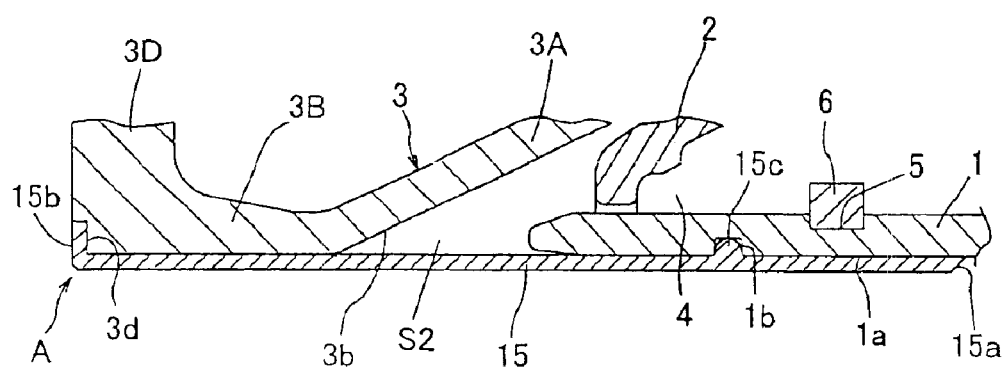
FIG. 9 is a magnified lateral cross section of the essential portions.

FIGS. 8 and 9 show an improvement of the telescopic flexible pipe joint described in the first embodiment. In this embodiment, the sleeve 15 is provided with a fixing means A that prevents the relative movement with respect to the second pipe members 3 in the direction of the pipe axis X. Furthermore, provisional stopping protrusions 15c that are provided at a plurality of locations in circumferential direction are engaged with a ring-shaped depression 1b formed at the inner circumferential surface 1a of the first pipe member 1 and prevent the relative movement in the direction of the pipe axis X of the sleeve 15 and the second pipe member 3. Thus, the provisional stopping of the provisional stopping protrusions 15c can be released by shearing due to external forces acting in the direction of the pipe axis X caused by earthquakes or the like.

At the base end side of the sleeve 15, one of the second pipe members 3 is fixed via the fixing means A, whereas the insertion front-end side of the sleeve 15 engages the depression 1b formed in the inner circumferential surface 1a of the first pipe member 1 via the provisional stopping protrusions 15c, so that even when a non-balanced force is acting due to the normal pressure of the pipe water, the two pipe members 1 and 3 do not extend or contract, but preserve a predetermined telescoping margin. However, when a large external force acts due to an earthquake or the like, then the provisional stopping protrusions 15c are sheared and the telescopic sliding ability of the pipe members 1 and 3 is ensured.

And moreover, since a sleeve 15 made of polyethylene is fitted into the pipe members 1 and 3, the intended purpose of effectively preventing the deposition of sludge and grime as well as impediments to the flow volume such as turbulences can be attained as well. In addition, since the structure for provisionally stopping relative movement of the pipe members 1 and 3 in the direction of the pipe axis X is made of a resinous sleeve, there is no corrosion, as there would be if a provisional stopping structure made of metal would be provided on the outer circumferential surface side of the pipe members 1 and 3, which ensures the provisional stopping effect of preventing the telescopic action of the two pipe members 1 and 3 for a long period of time, except when large forces are applied as during earthquakes, and is also advantageous with regard to manufacturing costs.

It should be noted that other aspects of the configuration of this embodiment are the same as than in the first embodiment, so that structural elements that are the same as in the first embodiment have been given the same numerals, and their further explanation has been omitted.

Third Embodiment

Figure 10:
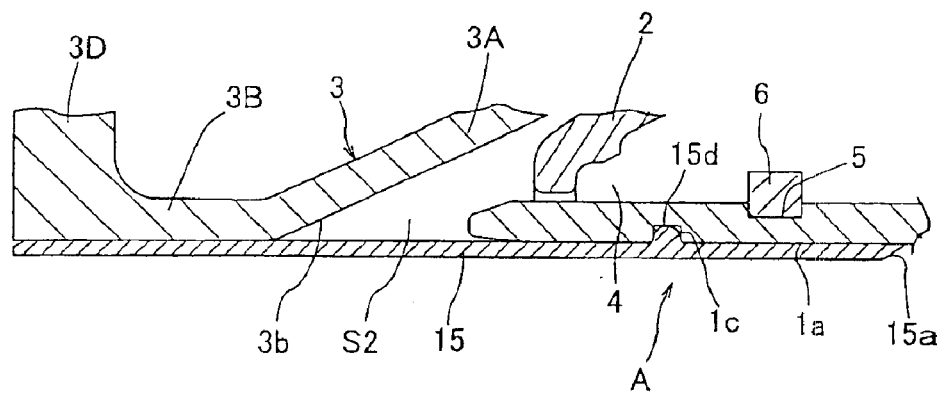
FIG. 10 is a magnified lateral sectional view of the essential portions of a telescopic flexible joint according to a third embodiment of the present invention.

FIG. 10 shows another modified embodiment of the fixing means A explained in the first embodiment. On the outer circumferential surface of the sleeve 15, locking protrusions 15d that are formed integrally at a plurality of locations in circumferential direction are engaged with an engaging groove 1c formed in the inner circumferential surface 1a of the first pipe member 1. Thus, relative movement in the direction of the pipe axis X of the sleeve 15 and the first pipe member 1 is prevented.

With this embodiment, the sleeve 15 and the second pipe member 3 can be slid relative to one another in the direction of the pipe axis X, different to the first embodiment.

It should be noted that other aspects of the configuration of this embodiment are the same as than in the first embodiment, so that structural elements that are the same as in the first embodiment have been given the same numerals, and their further explanation has been omitted.

Fourth Embodiment

Figure 11:
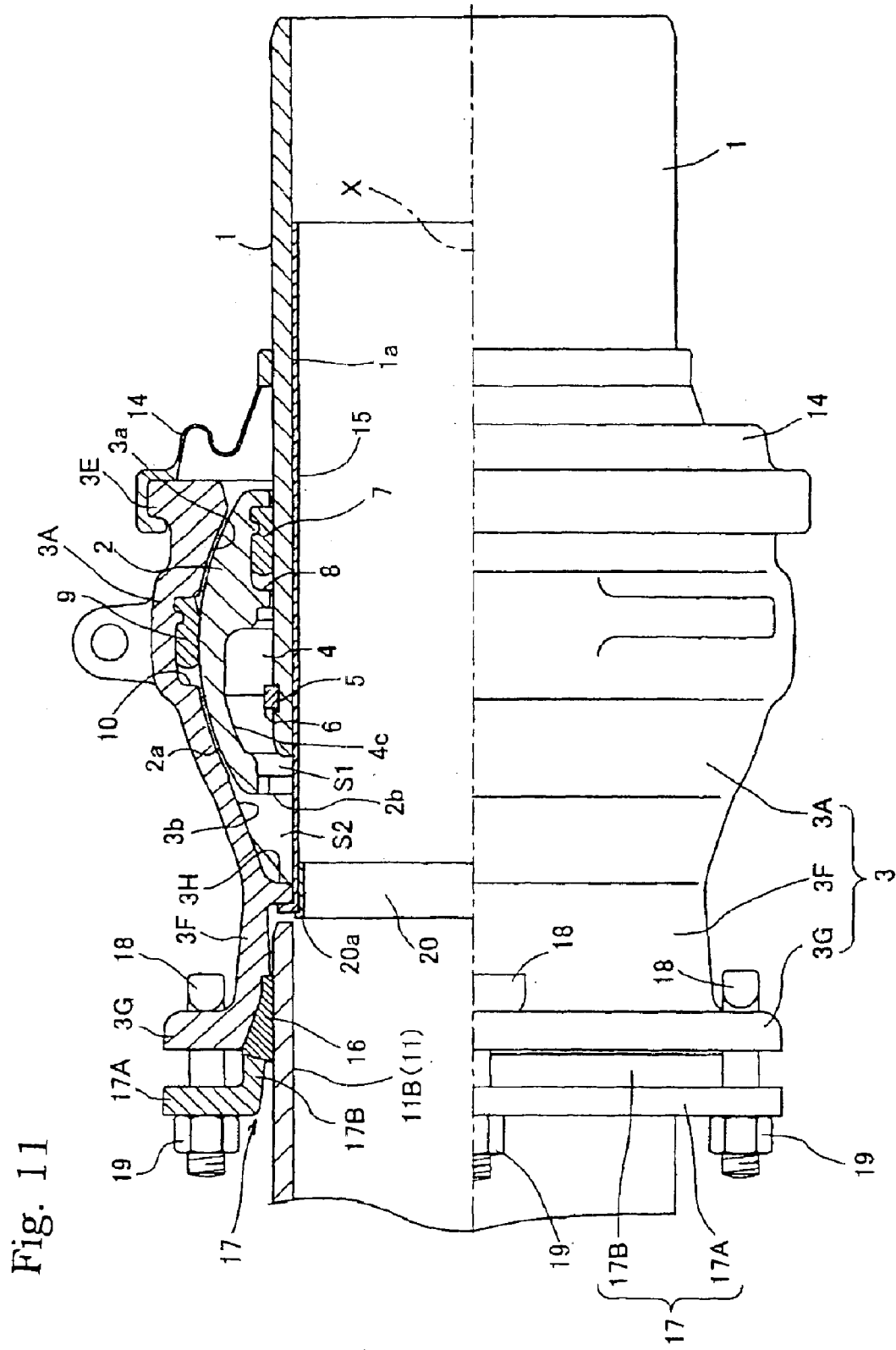
FIG. 11 is a half outside and half sectional magnified lateral view of a telescopic flexible joint according to a fourth embodiment of the present invention.

In the telescopic flexible joint shown in FIG. 11, a socket pipe portion 3F in which an inserted pipe portion 11B of a piping element having the same external diameter as the first pipe member 1 can be inserted and connected in the direction of the pipe axis X is formed integrally at the other end of the second pipe member 3. The coupling flange 3G formed integrally at the end of this socket pipe portion 3F is provided with a pusher ring 17 that hermetically fastens the inserted pipe portion 11B by compressing in the direction of the pipe axis X an elastic sealing member 16 disposed between the inner circumferential surface of the socket pipe portion 3F and the outer circumferential surface of the inserted pipe portion 11B.

The pusher ring 17 is configured by removably attaching a ring-shaped attachment frame 17A with bolts 18 and nuts 19 to the coupling flange 3G of the socket pipe portion 3F. The ring-shaped attachment frame 17A is formed in one piece with a presser portion 17B that presses the elastic sealing member 16 in the direction of the pipe axis X when fastening the bolts 18 and nuts 19.

A partition wall portion 3H is formed integrally in the middle between the spherical pipe portion 3A and the socket pipe portion 3F at the inner circumferential surface of the second pipe member 3, defining the maximum insertion position of the socket pipe portion 11B. The inner diameter of this partition wall portion 3H is the same as the inner diameter of the first pipe member 1. Between the inner circumferential surface of the partition wall portion 3H and the inner circumferential diameter of the first pipe member 1, an opening of a cavity portion that opens inward in radial direction at the location where the pipe members 1 and 3 are joined together, that is, an opening of a ring-shaped first cavity portion S1 is formed by opening a portion of the limiting groove formed at the inner circumferential surface of the spherical ring member 2 toward the flow path inside the pipe from the front end side of the first pipe member 1. Furthermore, an opening of a ring-shaped cavity portion S2 is formed by one end surface 2b of the spherical ring member 2 and the tapered inner circumferential surface 3b connected to the partially spherical inner circumferential surface 3a of the second pipe member 3. A sleeve 15 made of a synthetic resin is fitted tightly to the pipe members 1 and 3. This sleeve 15 has a length covering both openings and is elastically deformed while substantially maintaining its circular tube shape when it follows a flexure of the pipe members 1 and 3.

Since the partition wall portion 3H of the second pipe member 3 is short in the direction of the pipe axis X, a reinforcing core 20 made of synthetic resin or metal is press-fitted to the base end of the sleeve 15 fitted tightly to the partition wall portion 3H. The reinforcing core 20 prevents deformation of at least a portion of the inner circumferential surface of the sleeve 15, that is, the portion that is in contact with the inner circumferential surface of the partitioning wall portion 3H, and at the same time prevents relative movement in the direction of the pipe axis X with respect to the partitioning wall portion 3H of the second pipe member 3. Furthermore, the end of the reinforcing core 20 in the direction of the pipe axis X is provided with a brim portion 20a that abuts in the direction of the pipe axis X against the base end of the sleeve 15.

Thus, even if the contact length in the direction of the pipe axis X of the location where the outer circumferential surface of the sleeve 15 contacts the inner circumferential surface of the second pipe member 3 is short, when a counterforce acts on the contact location of the sleeve 15 as a result of a flexure of the pipe members 1 and 3, then protruding deformation in inward radial direction at the contact location of the sleeve 15 due to this counterforce can be prevented.

It should be noted that other aspects of the configuration of this embodiment are the same as than in the first embodiment, so that structural elements that are the same as in the first embodiment have been given the same numerals, and their further explanation has been omitted.

Fifth Embodiment

Figure 12:
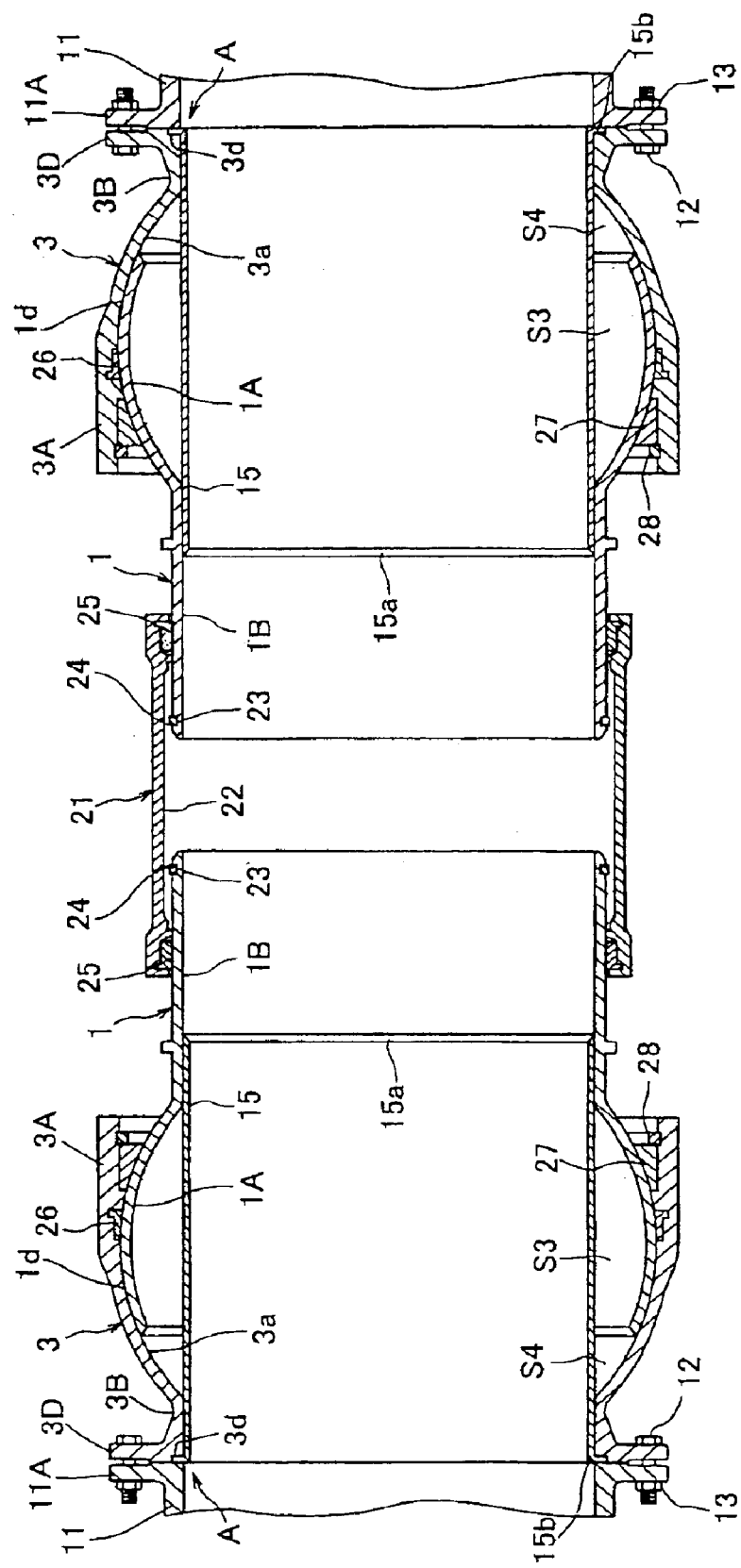
FIG. 12 is a magnified lateral sectional view of a telescopic flexible joint according to a fifth embodiment of the present invention.
Figure 13:
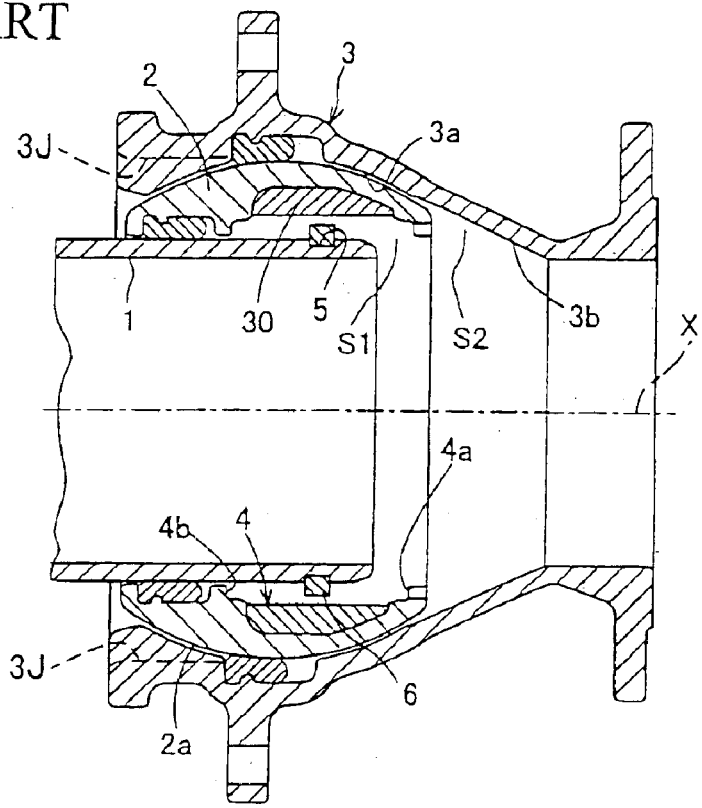
FIG. 13 is a magnified lateral sectional view of the essential portions of a conventional telescopic flexible joint.
Figure 14:
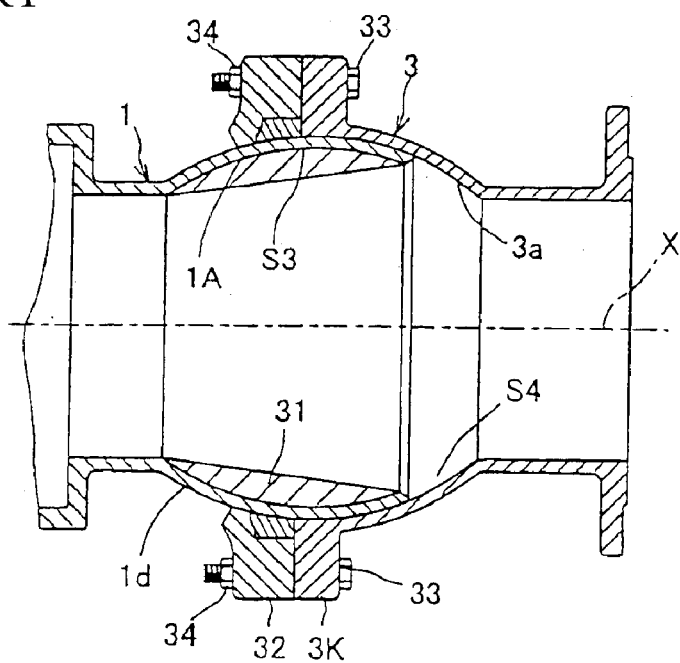
FIG. 14 is a magnified lateral sectional view of the essential portions of another conventional telescopic flexible joint.

In the telescopic flexible joint shown in FIG. 12, first pipe members 1 made of cast iron whose the front end is provided with an integrally formed, partially spherically shaped outer circumferential surface 1d are inserted into respective ends of a straight third pipe 21 made of cast iron, such that the first pipe member 1 and the third pipe 21 can slide with respect to one another in the direction of the pipe axis X. Moreover, partially spherical inner circumferential surfaces 3a formed at the end of the second pipe members 3 are fitted onto partially spherical outer circumferential surfaces id of spherical pipe portions 1A of the two first pipe members 1, allowing relative sliding between them.

A ring-shaped installation groove 23 is formed in each of the outer circumferential surfaces of the straight pipe portion 1B of the two first pipe members 1. The length in the direction of the pipe axis X of the ring-shaped installation grooves 23 is small compared to that of the ring-shaped limiting groove 22 formed in the middle (in direction of the pipe axis X) of the inner circumferential surface of the third pipe 21. A locking member 24 made of stainless steel is fitted removably into each of the installation grooves 23. The locking members 24 have an expandable diameter and limit the range in which the first pipe members 1 and the third pipe 21 can move relative to one another in the direction of the pipe axis X by abutting against end surfaces (in direction of the pipe axis X) of the limiting groove 22.

Elastic sealing members 25 made of synthetic rubber for sealing between the third pipe 21 and the outer circumferential surface of the straight portion 1B of the first pipe member 1 are held respectively near both ends in the direction of the pipe axis X of the inner circumferential surface of the third pipe 21. Also, elastic sealing members 26 made of synthetic rubber for sealing between the third pipe 21 and the partially spherical outer circumferential surface 1d of the spherical pipe portion 1A of the first pipe member 1 are held respectively at the partially spherical inner circumferential surfaces 3a of the spherical pipe portion 3A of the second pipe member 3. The respective ends of the straight pipe portions 3B of the second pipe members 3 are both provided with an integrally formed coupling flange 3D that can be rigidly coupled to a coupling flange 11A of a piping element 11, such as a water pipe or a gate valve, with bolts 12 and nuts 13.

The inner circumferential surfaces on the opening side of the spherical pipe portion 3A of the second pipe members 3 are each provided with a slide-guiding member 27 made of cast iron and a C-shaped catch member 28 made of stainless steel with expandable diameter. The slide-guiding member 27 is provided with a partially spherical sliding surface that slides against the partially spherical outer circumferential surface 1d of the spherical pipe portion 1A of the first pipe member 1. The catch member 28 abuts against the slide-guiding member 27 and thus prevents it from coming off.

At the location where the two pipe members 1 and 3 are joined together, an opening of a cavity portion that opens inward in radial direction, that is, a third ring-shaped cavity portion S3 is formed by opening the inner circumferential surface of the spherical pipe portion 1A of the first pipe member 1 toward the flow path inside the pipe. Furthermore, an opening of a ring-shaped cavity portion S4 is formed by the partially spherical inner circumferential surface 3a of the second pipe member 3 and the front end face of the spherical pipe portion 1A of the first pipe member 1. A sleeve 15 made of a synthetic resin is fitted tightly spanning from the opening on the coupling flange 3D side of the second pipe member 3 to the inner circumferential surfaces of the two pipe members 1 and 3. This sleeve 15 has a length covering the openings and is elastically deformed while substantially maintaining its circular tube shape when following a flexure of the two pipe members 1 and 3. Furthermore, a fixing means A preventing relative movement in the direction of the pipe axis X of the sleeve 15 and the second pipe member 3 is provided.

At the fixing means A, a circular ring-shaped brim portion 15b protruding outward in radial direction is formed integrally with the base end of the sleeve 15. Moreover, the coupling flange 3D of the second pipe member 3 is provided with a depression 3d into which the brim portion 15b of the sleeve 15 is inserted in the direction of the pipe axis X. The coupling flange 3D of the second pipe member 3 is fixed to the coupling flange 11A of the piping element 11. Thus, the fixing means prevents relative motion in the direction of the pipe axis X of the sleeve 15 and the second pipe member 3.

Other Embodiments (1) In the first to third embodiments, relative movement in the direction of the pipe axis X of the sleeve 15 with respect to the second pipe member 3 was suppressed by clamping the brim portion 15b of the sleeve 15 between the coupling flange 3D of the second pipe member 3 and the coupling flange 11A of the piping element 11, and in the fourth embodiment by press-fitting the reinforcement core 20 to the base end portion of the sleeve 15. However, it is also possible to fix the sleeve 15 to the first pipe member 2 or the second pipe member 3 by other fixing means, such as an adhesive.

(2) In the above-described embodiments, a fixing means A for preventing relative movement in the direction of the pipe axis X between the first pipe member 1 or the second pipe member 3 and the sleeve 15 was provided, but it is not necessary to provide such a fixing means A if the friction force between the inner circumferential surfaces of the two pipe members 1 and 3 and the outer circumferential surface of the sleeve 15 inserted therein ensures that the sleeve 15 will not be displaced by the flow of the fluid in the pipe.

(3) In the above-described embodiments, a single sleeve 15 is inserted and fitted, bridging the inner circumferential surfaces of the pipe members 1 and 3, but it is also possible to partition this sleeve 15 into two portions in the direction of the pipe axis X, install one end of each of the partitioned sleeve portions at the inner circumferential surface of the pipe members 1 and 3 such that relative movement with respect to the pipe axis direction is prevented, and joining the other ends of the two partitioned sleeve portions together such that they are elastically deformed while substantially maintaining a circular tube shape when following a flexure of the two pipe members 1 and 3.

(4) The above-described embodiments have been explained for the case that the inner diameters of the locations at the inner circumferential surface of the two pipe members 1 and 3 where the sleeve 15 are the same, but if the inner diameters of the locations of the inner circumferential surface of the pipe members 1 and 3 to which the sleeve 15 is fitted differ, then the outer diameter of the sleeve 15 should be changed accordingly.

What is claimed is:

1. A flexible pipe joint joining, in a bendable manner, a first pipe member provided with a partially spherical outer circumferential surface that protrudes outward in a radial direction and a second pipe member provided with a partially spherical inner surface that can slide along the partially spherical outer circumferential surface, wherein said first pipe member and said second pipe member are supported within the joint to be movable relative to each other along a pipe axis direction;

a sleeve of a synthetic resin is inserted and fitted in a state of contact, bridging the inner circumferential surfaces of the two pipe members, the sleeve having a length that covers a cavity portion that opens inward in a radial direction at a location where the two pipe members are joined together along an entire telescopic range of the two pipe members, and being elastically deformed while substantially maintaining its circular tube shape when following a flexure of the two pipe members; and wherein one of the first pipe member and the second pipe member is slidably mounted within the joint to permit relative motion in the pipe axis direction between the pipe members.

2. The flexible pipe joint according to claim 1, wherein the sleeve has a length that goes beyond an intersection between a virtually extended surface of the partially spherical outer circumferential surface and the inner circumferential surface of the first pipe member.

3. The flexible pipe joint according to claim 1 or 2, wherein a spherical ring member having a partially spherical outer circumferential surface is installed in the first pipe member such that the spherical ring member can slide within a predetermined range in the pipe axis direction.

4. The flexible pipe joint according to claim 3, wherein the sleeve is provided with a fixing means preventing relative motion in the pipe axis direction with respect to one of the pipe members, and a provisional stopping protrusion that, by engaging a depression formed in the inner circumferential surface of the other pipe member, prevents relative movement in pipe axis direction between the two pipe members, and wherein the provisional stopping protrusion is configured such that its provisional stopping can be released by shearing due to an external force in the pipe axis direction.

5. The flexible pipe joint according to claim 1, further comprising a fixing means for preventing relative motion in the pipe axis direction between one of the pipe members and the sleeve.

6. The flexible pipe joint according to claim 1, wherein a reinforcement core that suppresses deformation of the sleeve at least at a location that contacts a portion of the inner circumferential surface of the pipe members is inserted and fitted into the sleeve.

7. The flexible pipe joint according to claim 1, wherein the sleeve is made of polyethylene and has the shape of a circular tube, and the sleeve's thickness is in a range of 1.5 mm to 4.0 mm.

8. The flexible pipe joint according to claim 1, wherein a front end on the insertion side of the inner circumferential surface of the sleeve is provided with a tapered surface whose diameter becomes larger toward the front end.

9. A flexible pipe joint joining, in a bendable manner, a first pipe member provided with a partially spherical outer circumferential surface that protrudes outward in a radial direction and a second pipe member provided with a partially spherical inner surface that can slide along the partially spherical outer circumferential surface, wherein a sleeve made of a synthetic resin is inserted and fitted in a state of contact, bridging the inner circumferential surfaces of the two pipe members, the sleeve having a length that covers a cavity portion that opens inward in radial direction at a location where the two pipe members are joined together, and being elastically deformed while substantially maintaining its circular tube shape when following a flexure of the two pipe members;

a spherical ring member having a partially spherical outer circumferential surface installed in the first pipe member such that the spherical ring member can slide within a predetermined range in a pipe axis direction, and the sleeve has a length that can cover any cavity portion along an entire telescopic range of the two pipe members, wherein the sleeve is provided with a fixing means preventing relative motion in the pipe axis direction with respect to one of the pipe members, and a provisional stopping protrusion that, by engaging a depression formed in the inner circumferential surface of the other pipe member, prevents relative movement in the pipe axis direction between the two pipe members, and wherein the provisional stopping protrusion is configured such that its provisional stopping can be released by shearing due to an external force in the pipe.

* * * * *

UNITED STATES PATENT AND TRADEMARK OFFICE
CERTIFICATE OF CORRECTION

PATENT NO. : 6,883,550 B2
DATED : April 26, 2005
INVENTOR(S) : Bekki et al.

It is certified that error appears in the above-identified patent and that said Letters Patent is hereby corrected as shown below:

Column 14,
Line 2, "in pipe axis" should read -- in the pipe axis --.

Signed and Sealed this

Fourth Day of October, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,883,550 B2 |
| APPLICATION NO. | : 10/648882 |
| DATED | : April 26, 2005 |
| INVENTOR(S) | : Bekki et al. |

It is certified that error appears in the above-identified patent and that said Letters Patent is hereby corrected as shown below:

<u>Face of Patent</u>, See Item (73) Assignee, "Waterworks Technology Development" should read -- Waterworks Technology Development Organization Co., Ltd. --

Signed and Sealed this

Fifth Day of December, 2006

JON W. DUDAS
*Director of the United States Patent and Trademark Office*